US012808485B2

(12) United States Patent
Bäumer

(10) Patent No.: US 12,808,485 B2
(45) Date of Patent: Nov. 24, 2026

(54) METHOD FOR PRODUCING A POLAR CAP REINFORCEMENT OF A PRESSURE VESSEL

(71) Applicant: Thomas Bäumer, Hückelhoven (DE)

(72) Inventor: Thomas Bäumer, Hückelhoven (DE)

( * ) Notice: Subject to any disclaimer, the term of this patent is extended or adjusted under 35 U.S.C. 154(b) by 0 days.

(21) Appl. No.: 18/859,091

(22) PCT Filed: Mar. 9, 2023

(86) PCT No.: PCT/EP2023/055975
§ 371 (c)(1),
(2) Date: Oct. 22, 2024

(87) PCT Pub. No.: WO2023/213465
PCT Pub. Date: Nov. 9, 2023

(65) Prior Publication Data

US 2025/0277561 A1 Sep. 4, 2025

(30) Foreign Application Priority Data

May 3, 2022 (DE) ........................ 102022110846.5

(51) Int. Cl.
*F17C 1/06* (2006.01)
*B29C 70/32* (2006.01)

(52) U.S. Cl.
CPC ................ *F17C 1/06* (2013.01); *B29C 70/32* (2013.01); *F17C 2203/0604* (2013.01); *F17C 2203/0619* (2013.01); *F17C 2209/234* (2013.01)

(58) Field of Classification Search
CPC ...................................................... B29C 70/32
See application file for complete search history.

(56) References Cited

U.S. PATENT DOCUMENTS 9,133,860 B2 * 9/2015 Kloft ......................... F15B 1/16
2021/0324999 A1 * 10/2021 Bäumer .................... F17C 1/06

FOREIGN PATENT DOCUMENTS

CN 108869737 * 11/2018
DE 69727890 T2 1/2005

(Continued)

OTHER PUBLICATIONS

German Office Action for DE 10 2022 110 846.5, dated Dec. 14, 2022. German Patent and Trademark Office, Munich, Germany.

(Continued)

*Primary Examiner* — Edmund H Lee
(74) *Attorney, Agent, or Firm* — M&B IP Analysts, LLC

(57) ABSTRACT

A method for producing a polar cap reinforcement of a pressure vessel includes providing a winding device including two winding plates, which are spaced apart and form a gap, in which there is a winding core; producing a resin-impregnated fiber laminate inside the gap generated by repeated winding around the winding core; detaching the fiber laminate from the winding device and applying the fiber laminate onto a first molding tool with the domed outer contour of a polar cap region of the inner vessel; positioning a second molding tool with the outer contour of the polar cap reinforcement to be produced, to enclose the fiber laminate between the first molding tool and the second molding tool; forming the shape of the polar cap reinforcement between the two molding tools by deforming the fiber laminate between the two molding tools; curing the fiber laminate to form the polar cap reinforcement.

9 Claims, 9 Drawing Sheets

(56) References Cited

FOREIGN PATENT DOCUMENTS

| | | | |
|---|---|---|---|
| DE | 102010033623 | A1 | 2/2012 |
| DE | 102011116553 | * | 4/2013 |
| DE | 102013113208 | * | 6/2015 |
| DE | 202016100754 | * | 3/2016 |
| DE | 2015106461 | * | 10/2016 |
| DE | 102017208492 | A1 | 11/2018 |
| JP | 2020520828 | A | 7/2020 |
| WO | WO2019206959 | * | 10/2019 |
| WO | WO2021220305 | * | 11/2021 |
| WO | WO2024161002 | * | 8/2024 |

OTHER PUBLICATIONS

International Search Report for PCT/EP2023/055975, dated Jun. 30, 2023. Searching Authority, European Patent Office, Rijswijk, Netherlands.

Written Opinion of the Searching Authority for PCT/EP2023/055975, dated Jun. 30, 2023. Searching Authority, European Patent Office, Rijswijk, Netherlands.

Second Office Action for DE application 10 2022 110 846.5, dated Dec. 11, 2025. German Patent and TradeMark Office, Munich, Germany.

* cited by examiner

METHOD FOR PRODUCING A POLAR CAP REINFORCEMENT OF A PRESSURE VESSEL

TECHNICAL FIELD

The present disclosure relates to a method for producing a polar cap reinforcement of a fiber-reinforced pressure vessel and to a method for producing a pressure vessel having at least one such polar cap reinforcement. The present disclosure further relates to a pressure vessel having such a polar cap reinforcement including circumferential windings.

BACKGROUND

Pressure vessels play an important role in the field of energy transition because gases such as natural gas and hydrogen gas initially need to be stored for a variety of applications. In many cases, it is advantageous to store the gases at high pressure because a larger amount of gas can thereby be stored in a smaller volume. This is the case, for example, for the hydrogen propulsion of buses, trucks, automobiles or aircraft.

SUMMARY

In order to keep the weight for these mobile applications as low as possible, type 4 pressure vessels are preferably used, in particular fiber-reinforced plastic liners, CFRP reinforcement preferably being used. The high demand for lightweight pressure vessels, which are preferably produced in large parts from fiber composite materials, may however lead to the situation that insufficient raw material (carbon fibers) is available. Merely for this reason, it is expedient to keep the use of fiber reinforcement as low as possible so that the material consumption per volume of gas stored is as low as possible. Further, such vessels should be as lightweight as possible and the production costs should be kept low, which also militates for the least possible material consumption in the fiber reinforcement.

Type 4 fiber-reinforced pressure vessels usually include a cylindrical central part, adjacent to each side of which there is a domed polar cap that closes the pressure vessel. In order to seal the pressure vessel, an internal plastic liner is used, which has the appropriate shape (cylinder and polar cap both sides) and is reinforced with an outer layer of fiber composite material. One method often used for reinforcing the plastic liner is the filament winding method in which high-strength fibers are impregnated with a matrix and wound onto the plastic liner while it rotates. After crosslinking of the matrix system, the vessel is reinforced sufficiently for it to be able to withstand the high pressures for the gas storage.

The dimensioning of the fiber reinforcement may be broadly divided into two regions, specifically the reinforcement of the cylindrical part of the pressure vessel and the reinforcement of the domed polar caps. In the cylindrical region of the vessel, the radial forces are two times as high as the axial forces (Barlow's formula), i.e. approximately two times as many fibers need to be wound in the radial direction than in the axial direction. Because of its three-dimensional contour, the polar cap region is much more difficult to dimension since a circumferential reinforcement cannot be wound there, at least not directly and on "industrial scales", namely with a high speed and high throughput.

The reason for this is that the fibers do not adhere and remain on the oblique face of a polar cap, but instead they slip down the polar cap and therefore prevent design-compliant polar cap reinforcement from being possible. In some known methods, the necessary radial reinforcement of the fiber reinforcement are generated by a large number of steep helical windings (cross-windings at a particular angle with respect to the winding axis). This requires very many more windings, which have many different winding angles, than would actually be necessary with a pure radial reinforcement at 90°. The effect of this is that there are also many axial fiber plies in the cylindrical part of the pressure vessel, but these are actually used only in the polar cap region.

Since the fiber consumption and the associated production costs are very high, especially for long vessels, it is desirable to reduce the fiber consumption. This is possible, for example, when the polar cap reinforcement and the fibers needed therefore can be used only in the polar cap region of a liner. For example, methods that enable purposeful polar cap reinforcement are known in the art. Although various approaches for minimizing the expense of such purposeful polar cap reinforcement are possible in principle, they do not have the high productivity that is needed for industrial manufacture with high production numbers. The high investment costs when setting up production may necessitate that a maximum throughput be made possible and the manufacturing process not be held up by a "slow production step".

It is therefore obvious to decouple this production step—reinforcing the polar caps in the circumferential direction—from the overall winding process and to carry it out separately before delivering the prepared plastic liner with the polar cap reinforcements to the final winding process. For example, a polar cap region may be reinforced by a so-called fiber placement method before the actual winding process is carried out. In this case, preimpregnated fiber tapes (prepregs) are placed by a robot onto the polar caps by means of a placement head. A disadvantage with this method is, however, that it involves a separate upstream production method in which preimpregnated tapes are processed. The matrix material used in the fiber placement method and in the subsequent winding method are moreover different and must be capable of being connected to one another.

Furthermore, there are other upstream production methods by which a polar cap reinforcement may be generated. Often, structures on which the fibers to be wound receive support so that they do not slip are provided on a liner. By appropriate shaping and arrangement of such holding structures, the polar caps can be wound before the cylindrical region of a pressure vessel. For example, JP 2010-236614 A discloses a method for producing a composite pressure vessel in which holding structures in the form of circumferential grooves or individual knobs are formed on the polar caps of a liner. The polar caps are wound first by means of these holding structures, followed by the cylindrical region of the liner. The method is completed with a winding layer, that covers both the polar caps and the cylindrical region. For example, the patent specification DE 10 2018 110 049 B4 also discloses a method for producing a polar cap reinforcement in the polar cap region of a pressure vessel, in which a holding device with a plurality of protruding holding elements is applied in the region of an end portion of the cylindrical central region of a liner. A polar cap reinforcement is then produced by winding fiber material around at least a part of the polar cap region and the end portion with the holding device, the fiber material being guided with direction reversal around the protruding holding elements of the holding device.

Winding devices are also known with which an attempt is made to produce only circumferential windings in the polar cap region of a liner. For example, the patent specification DE 10 2015 007 047 B4 discloses a method in which the outer face of a polar cap is defined by a plurality of shaping parts. The shaping parts are arranged successively, starting from a winding axis of the winding body, outward on the winding axis and a gap between the winding mandrel and the respectively previously arranged shaping part is filled with circumferential windings. The shaping parts are subsequently removed.

On the basis of this, the object of the present disclosure is to provide an improved method for producing a polar cap reinforcement of a fiber-reinforced composite pressure vessel, by which the amount of reinforcing fibers for production may be reduced without a significantly increased production expense, the method ensuring in particular a high productivity for the production of the composite pressure vessel.

It should be pointed out that the features mentioned individually in the claims may be combined with one another in any technically expedient way and present further configurations of the disclosed embodiments. The description additionally characterizes and specifies the disclosed embodiments particularly in connection with the figures.

With the present disclosure, pressure vessels comprising an inner vessel and an outer layer of a composite fiber material wound onto the inner vessel may be produced. Known materials may be used for the inner vessel and the outer layer of a fiber material. The inner vessel is preferably a plastic liner including a thermoplastic, which may be produced by extrusion blow molding in particular. For example, a carbon, aramid or glass fiber with a suitable matrix including a resin may be used as a fiber material for reinforcing the inner vessel with an outer layer.

A pressure vessel needs to be suitably reinforced axially and radially when the inner vessel/liner undertakes only the sealing function and constitutes the winding core for a winding method. The axial reinforcement of a type 4 wound pressure vessel runs from one pole to the other and usually also encloses the so-called boss connection at both ends, so that the latter is firmly incorporated. The typical winding angle is 5-15°, because there is thereby still no substantial decrease of the strength values in the laminate compared with a 0° laminate. In the cylindrical part of the liner, radial reinforcement is possible with standard winding methods.

The present disclosure now makes it possible to reinforce a liner—preferably a plastic liner—in a separate process in the polar cap region by pure radial fiber plies. The liner then prepared with two polar cap reinforcements is delivered to the actual winding process and may then be provided with the radial windings in the cylindrical part and with the necessary axial windings (and compressive radial windings).

The method according to the disclosed embodiments is firstly used to produce a polar cap reinforcement of a pressure vessel comprising an inner vessel and an outer layer of reinforcing fibers, which is wound around the inner vessel, wherein the inner vessel has a cylindrical central region and two domed polar cap regions which seal the openings of the cylindrical central region. The method comprises the following steps:

a) providing a winding device comprising two winding plates, which are spaced apart from one another and form a gap between them, in which there is a winding core;
b) producing a resin-impregnated fiber laminate inside the gap, which is generated by repeated winding around the winding core in the circumferential direction;
c) detaching the fiber laminate from the winding device and applying the fiber laminate onto a first molding tool which has the outwardly domed outer contour of a polar cap region of the inner vessel;
d) positioning a second molding tool, which has the outer contour of the polar cap reinforcement to be produced as an inner contour, in order to enclose the fiber laminate between the first molding tool and the second molding tool;
e) forming the shape of the polar cap reinforcement between the two molding tools by deforming the fiber laminate between the two molding tools under pressure;
f) curing the fiber laminate to form the polar cap reinforcement.

The method according to the present disclosure offers the advantage that a polar cap reinforcement can thereby be produced with pure circumferential windings. This significantly reduces the fiber amount for the pressure vessel as a whole, since unnecessary windings in the cylindrical region can therefore be avoided. Fiber laminate with pure circumferential windings is initially produced in a winding tool and subsequently integrated into the outer fiber reinforcement of a pressure vessel. During the deformation of the resin-impregnated fiber laminate to the final contour, the radially wound layers can slide on one another without rejects being created.

In a first embodiment of the present disclosure, the first molding tool is the domed polar cap region of the inner vessel itself, for which the polar cap reinforcement is to be produced, and the second molding tool is removed after the curing of the fiber laminate to form the polar cap reinforcement. The inner vessel itself is therefore used as a molding tool and the polar cap reinforcement is generated directly on the polar cap region of an inner vessel by the impregnated, or gelled, fiber laminate being placed on the inner vessel and deformed and cured there. This has the advantage in particular that the inner contour of the polar cap reinforcement is matched exactly to the outer contour of the polar cap region of the inner vessel. The cured polar cap reinforcement may then remain on the inner vessel in question, or it is removed and applied onto another inner vessel in a later production stage.

In an alternative embodiment of the present disclosure, the first molding tool is a separate tool which replicates the outwardly domed outer contour of the polar cap region of the relevant inner vessel and is used to mold the inner contour of the polar cap reinforcement. The cured polar cap reinforcement is then released from the two molding tools and applied onto the domed polar cap region of an inner vessel. The polar cap reinforcement is preferably fixed there, which is done for example by adhesive bonding. This procedure has the advantage in particular that a plurality of polar cap reinforcements can be generated in a separate production process and stored until they are subsequently integrated into the fiber reinforcement of a liner in an optimized process.

The contour of the radial reinforcement in the polar cap region may be configured differently according to the vessel design. The inner contour of the second molding tool establishes the outer contour of the polar cap reinforcement, and the shape of the fiber laminate to be cured can be defined more accurately by the deformation of the fiber laminate between the two molding tools. It is, however, advantageous that the basic shape of the fiber laminate generated in the winding device already corresponds substantially to the shape that the polar cap reinforcement to be produced is intended to have. The circumferential windings in the fiber laminate then do not need to be displaced very greatly relative to one another. The simplest contour results when the distance between the winding plates in the winding device is constant. The radial reinforcement of the fiber laminate then initially has the same wall thickness everywhere as seen in the axial direction, which may be substantially preserved in the following deformation process so that only the curvature is formed. If the wall thickness is intended to increase outward, for example, a winding device is used with winding plates whose distance from one another decreases toward the winding core. This may likewise be maintained in the following deformation process.

In order to be able to detach the impregnated fiber laminate easily from the winding plates, according to one embodiment, before the fiber laminate is produced, the inner sides of the winding plates are each coated with a detachable film which is subsequently detached from the winding device together with the fiber laminate. The film is in particular an extensible and thermally stable film. Preferably, the fiber laminate is also deformed and cured together with the films between the molding tools. This has the advantage that the films contribute to the geometrical stability of the laminate during the handling of the impregnated fiber laminate. Further, the films facilitate the release of the cured fiber laminate from the molding tools. The films are however preferably not connected firmly and materially to the fiber laminate, but can be removed again. At least the outer film of a polar cap reinforcement generated from the fiber laminate is removed again before the outer winding of the pressure vessel is generated thereon, so that the outer winding can be connected to the polar cap reinforcement. The inner film may likewise be removed, or it optionally remains between the inner vessel and the polar cap reinforcement. This is the case in particular when the polar cap reinforcement has been generated directly on the outwardly domed polar cap region of a plastic vessel.

The detachment of the fiber laminate from the winding device and the introduction between the two molding tools may take place in various ways, and are preferably configured so that the shape of the fiber laminate remains stable. For example, method step c) may involve initially separating a first winding plate and the winding core on the winding device in order to place the fiber laminate only with the second winding plate on the first molding tool, and then also removing the second winding plate. The second winding plate is used to maintain the shape of the soft, deformable fiber laminate until it is placed securely on the first molding tool.

The present disclosure further comprises a method for producing a pressure vessel having at least one polar cap reinforcement that has been produced in this way. The method comprises the following steps:

i. providing an inner vessel, which has a cylindrical central region and two domed polar cap regions, which seal the openings of the cylindrical central region;
ii. producing at least one polar cap reinforcement by a method according to one embodiment of the present disclosure and applying the polar cap reinforcement on a domed polar cap region of the inner vessel;
iii. producing a circumferential winding on the cylindrical central region of the inner vessel;
iv. winding an outer winding around the circumferential winding and the at least one polar cap reinforcement.

Preferably, both polar cap regions of the inner vessel are provided with a polar cap reinforcement that has been produced by a method according to one embodiment of the present disclosure. Further, the polar cap reinforcements may be generated directly on the inner vessel by the method according to the disclosed embodiments, or they are generated separately and subsequently fixed in the polar cap regions of the inner vessel. As already mentioned, this may for example be done by adhesive bonding. The subsequent circumferential winding on the cylindrical central region of the inner vessel is in particular wound to a thickness such that an unbroken and uniform surface is obtained with the at least one polar cap reinforcement. Such a production process has the advantage that continuous winding of the inner vessel can take place without substantial interruptions after the application of the polar cap reinforcements. This leads to high productivity.

According to one embodiment of the present disclosure, the at least one domed polar cap region of the inner vessel has a connecting flange which surrounds the annular polar cap reinforcement after the removal of the winding core. The outer diameter of the winding core is correspondingly selected so that the connecting flange can be fed through the resulting opening in the fiber laminate.

The present disclosure further comprises a pressure vessel comprising an inner vessel and an outer layer of reinforcing fibers, which is wound around the inner vessel, wherein the inner vessel has a cylindrical central region and two domed polar cap regions which seal the openings of the cylindrical central region. The outer layer of reinforcing fibers has, in at least one domed polar cap region of the inner vessel, a polar cap reinforcement having circumferential windings, which has been produced by a method according to one embodiment of the present disclosure. Such a pressure vessel has the advantage that the radial reinforcement is produced in the polar cap region without unnecessary fiber material having been consumed during production. It is lightweight and can readily be manufactured on an industrial scale.

Further advantages, features and expedient developments of the embodiment may be found in the dependent claims and the following description of preferred exemplary embodiments with the aid of the drawings.

DETAILED DESCRIPTION

Figure 1:
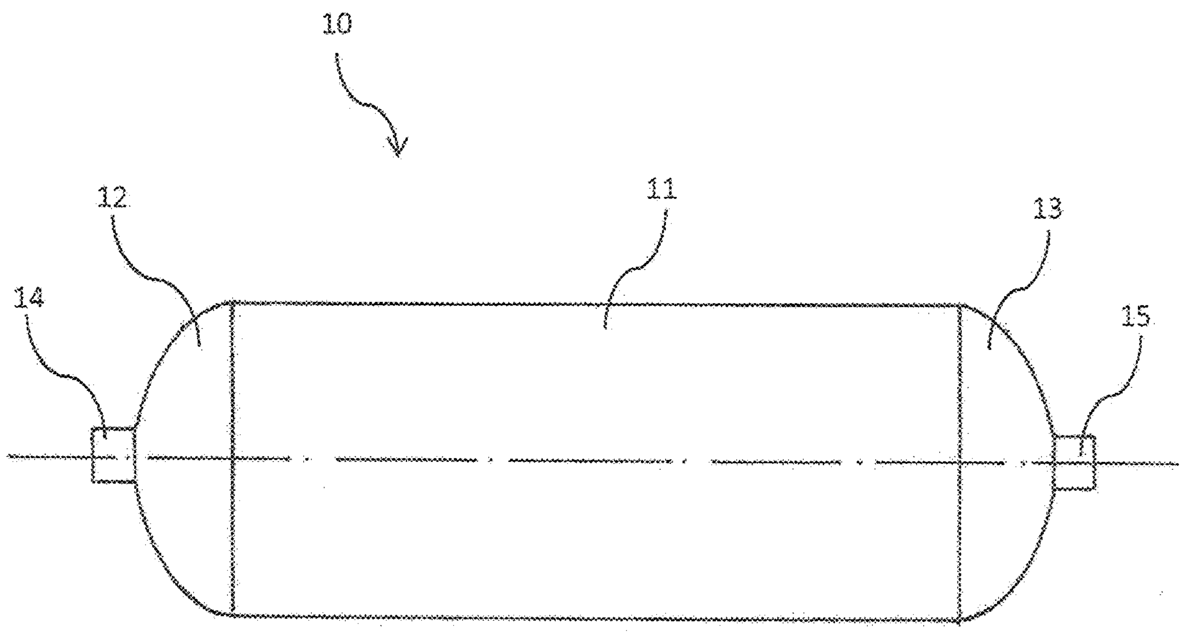
FIG. 1 shows a pressure vessel.

A pressure vessel, or composite pressure vessel, to be produced with the polar cap reinforcement according to an embodiment is represented by way of example in FIG. 1. The pressure vessel 10 comprises a cylindrical central part 11 and two domed polar caps 12 and 13, which seal the openings of the cylindrical central part 11. Protruding connecting flanges 14 and 15 may be provided on these polar caps 12, 13, although the shape and arrangement of these connections 14, 15 are to be understood only schematically and by way of example. Such connecting flanges are also referred to as boss connections. At its ends, the cylindrical central part 11 comprises end portions that are adjacent to the domed polar caps 12, 13.

Figure 2:
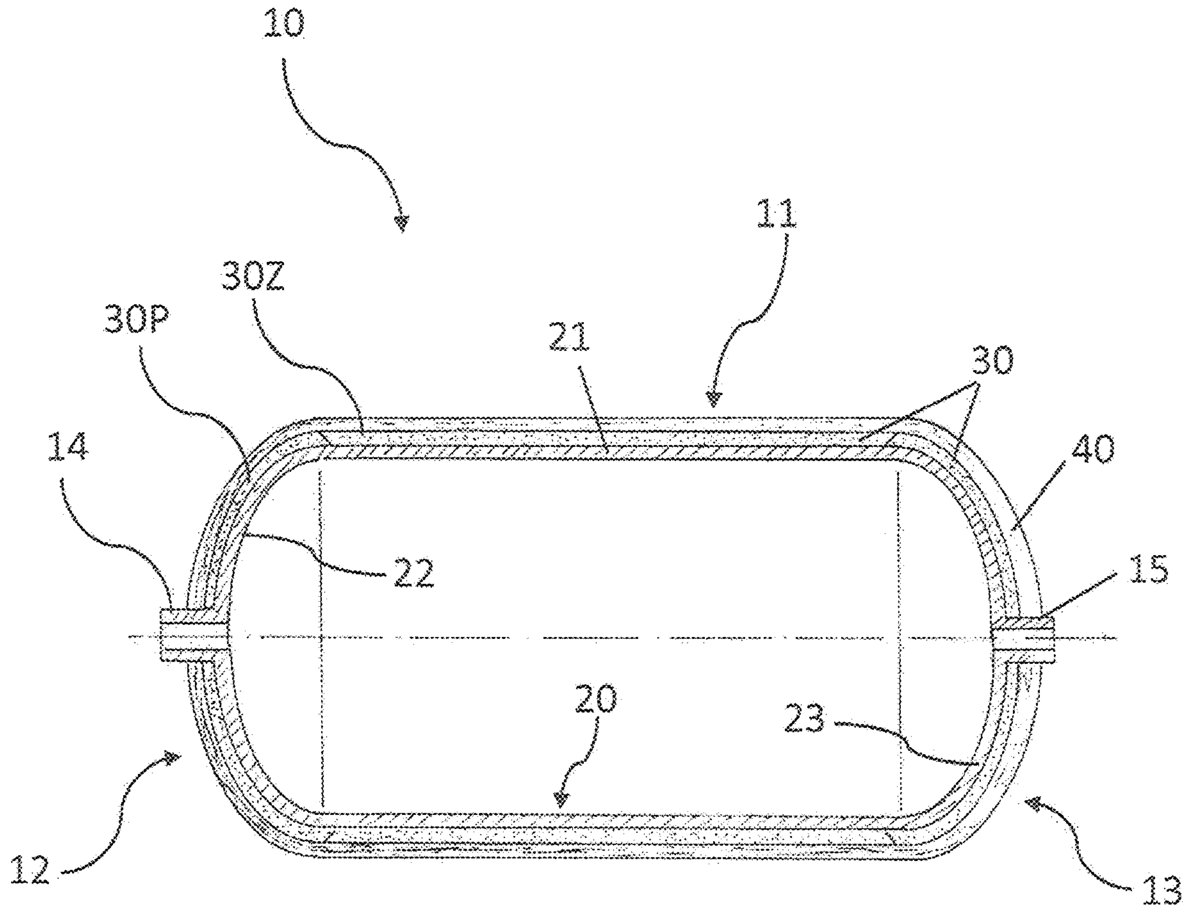
FIG. 2 shows a schematic longitudinal section through a pressure vessel according to FIG. 1.

Such a pressure vessel 10 is produced by reinforcing an inner vessel with an outer layer of fiber reinforcement. FIG. 2 shows this structure of the pressure vessel 10 in a schematic longitudinal section. An outer layer of reinforcing fibers, which comprises radial and axial reinforcements, is wound around an inner vessel 20. The shape of the inner vessel 20 corresponds substantially to the shape of the pressure vessel 10 to be produced, so that the inner vessel 20 comprises a cylindrical central region 21 and two domed polar cap regions 22 and 23, which seal the openings of the cylindrical central region 21. The inner vessel 20 is preferably formed by a plastic liner, the shape of which has been produced for example by an extrusion blow molding method. Such an inner vessel 20 is wound with reinforcing fibers at different angles and with different profiles.

FIG. 2 shows a fiber reinforcement of a plastic liner 20, as this reinforcement is advantageously configured. It provides a radial reinforcement 30 on the entire liner 20, including the cylindrical central region 21 and the two polar cap regions 22 and 23. Further, an axial reinforcement 40 is provided over the vessel 10. By this ideal fiber alignment in the force direction, the maximum laminate and fiber properties can be exploited.

Figure 3:
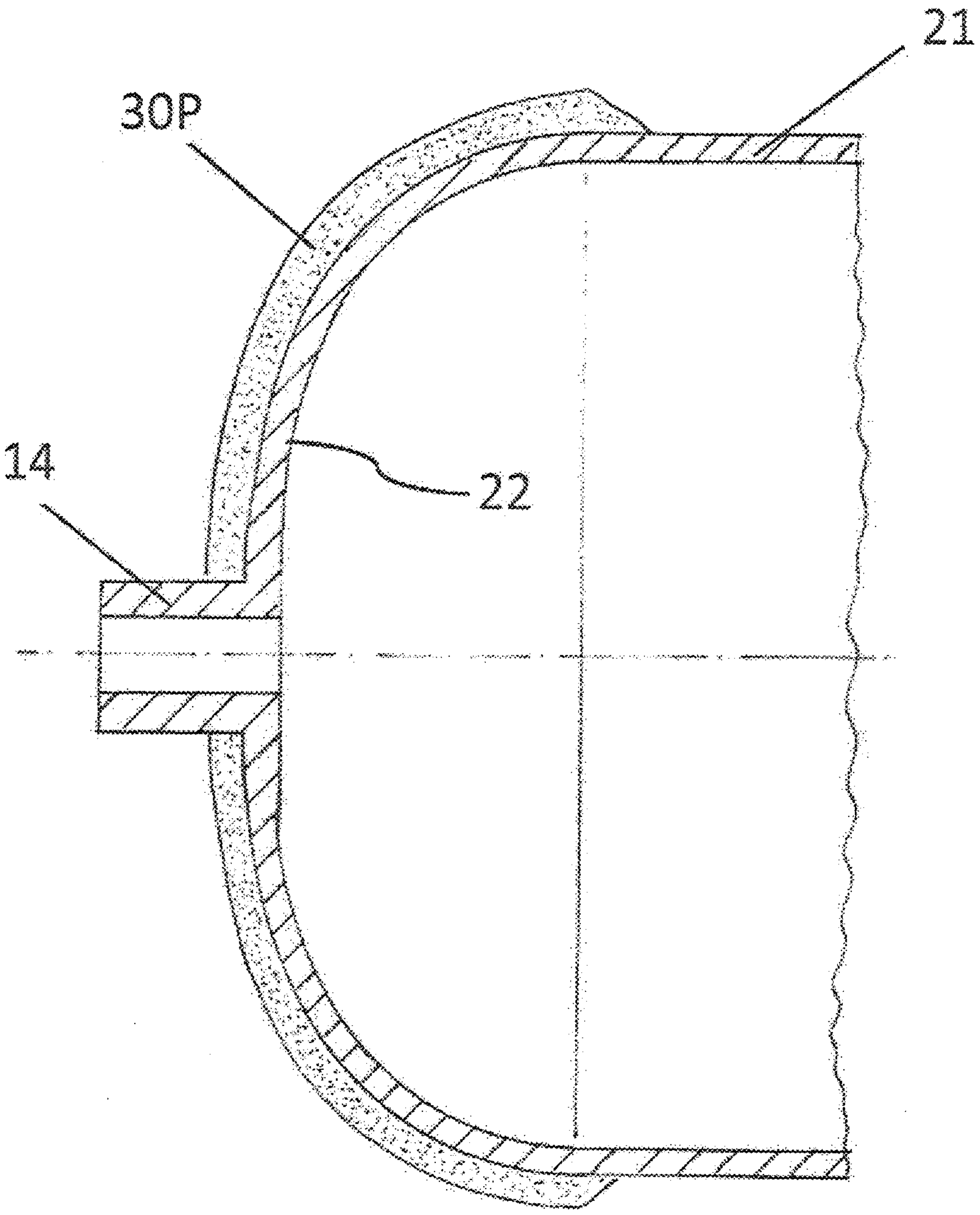
FIG. 3 shows an enlarged view of a polar cap region with radial reinforcement.

Since a radial reinforcement 30 cannot readily be wound continuously on a domed polar cap region, this radial reinforcement 30 is divided into a cylinder reinforcement 30Z and two polar cap reinforcements 30P. The cylinder reinforcement 30Z is located in the cylindrical region of the pressure vessel 10, while each polar cap respectively has a polar cap reinforcement, only a left polar cap reinforcement being provided by way of example with the reference sign 30P in FIG. 2. FIG. 3 shows the left polar cap region 22 of a liner once more on an enlarged scale. The polar cap reinforcement 30P covers the region from the boss connection 14 to the cylindrical central region 21 of the liner and optionally continues into the cylindrical central region 21, as is the case in the embodiment of FIG. 3. The two polar cap reinforcements 30P are preferably produced before the cylinder reinforcement 30Z and before the axial reinforcement 40 is applied. The production of a polar cap reinforcement 30P in a separate winding process will be described below.

For the separate winding process, a winding tool is used and the polar cap reinforcement 30P is partially generated separately from the liner 20. Such a winding tool 50 is represented schematically in FIG. 4. It includes essentially of two winding plates 51 and 52, which are clamped parallel and at a distance with respect to one another onto a winding axis 53, so that there is a predefined gap 55 with a width x between the plates 51, 52. An annular spacer or winding core 54 is inserted at the bottom of the gap 55. For easy later handling, in one embodiment the inner sides of both winding plates are each furthermore coated with an extensible, thermally stable film 60, 61.

Figure 5:
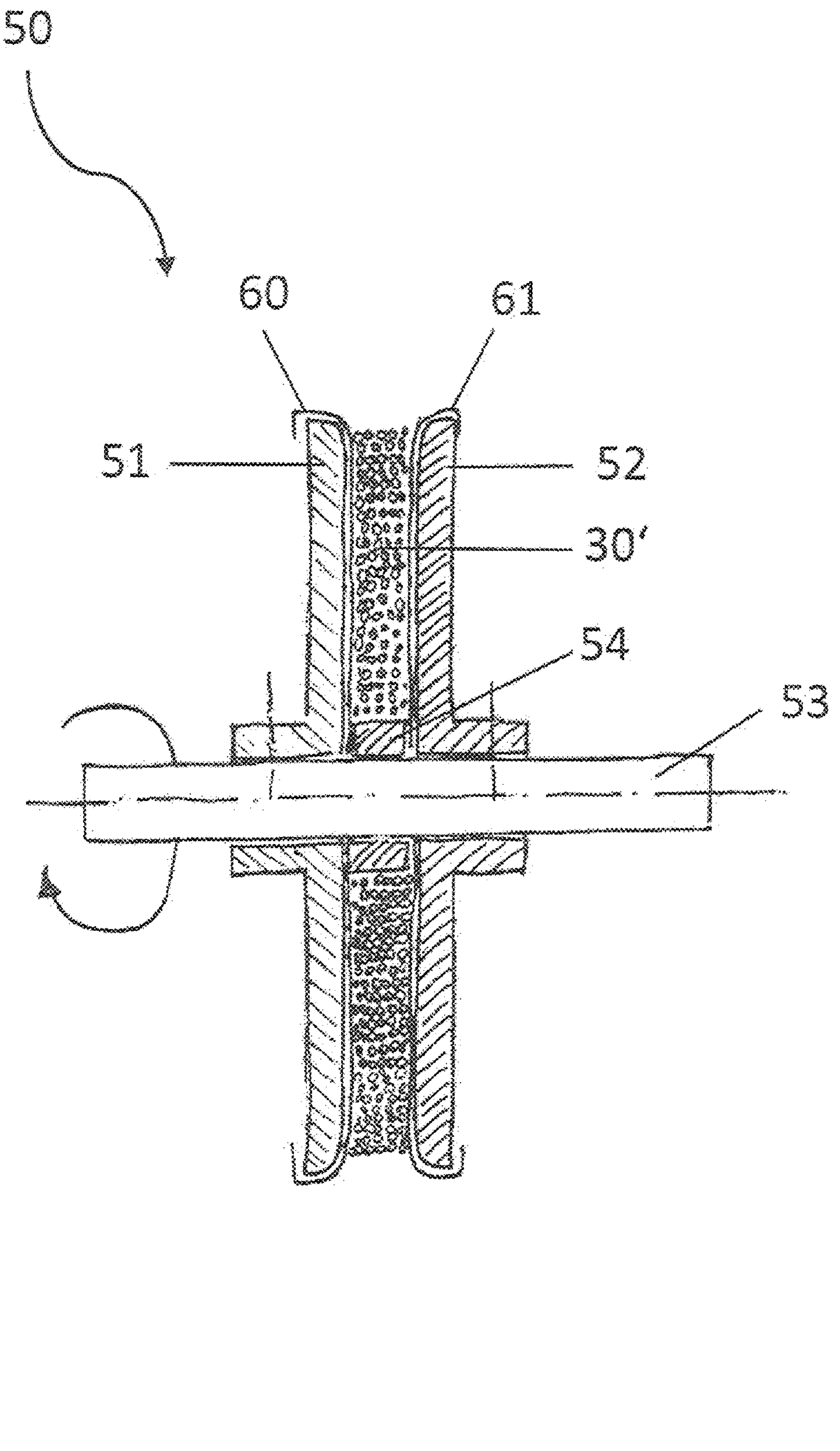
FIG. 5 shows a winding device according to FIG. 4 with a fiber laminate that has been produced.

The gap 55 between the two winding plates 51, 52 is fully wound with circumferential plies, a plurality of circumferential plies being wound next to one another and above one another around the winding core 54 by rotating the winding device 50 about the winding axis 53. The circumferential plies are, for example, in situ impregnated reinforcing fibers or towpregs. This may be done in parallel with a plurality of winding tools, which increases the productivity. FIG. 5 shows a winding tool 50 after the winding process, its gap 55 being filled with a fiber laminate including circumferential windings. This production stage of the resin-impregnated fiber laminate is denoted by the reference sign 30'.

Subsequently, the winding tool 50 is preferably rotated and brought into a position in which the winding plates and therefore the fiber laminate 30' lie horizontally. The winding axis 53 and one winding plate are removed, the fiber laminate 30' lying on the remaining winding plate 51. The film 60, 61 remains on both sides of the fiber laminate 30', while the winding core 54 is optionally also removed.

Figure 6:
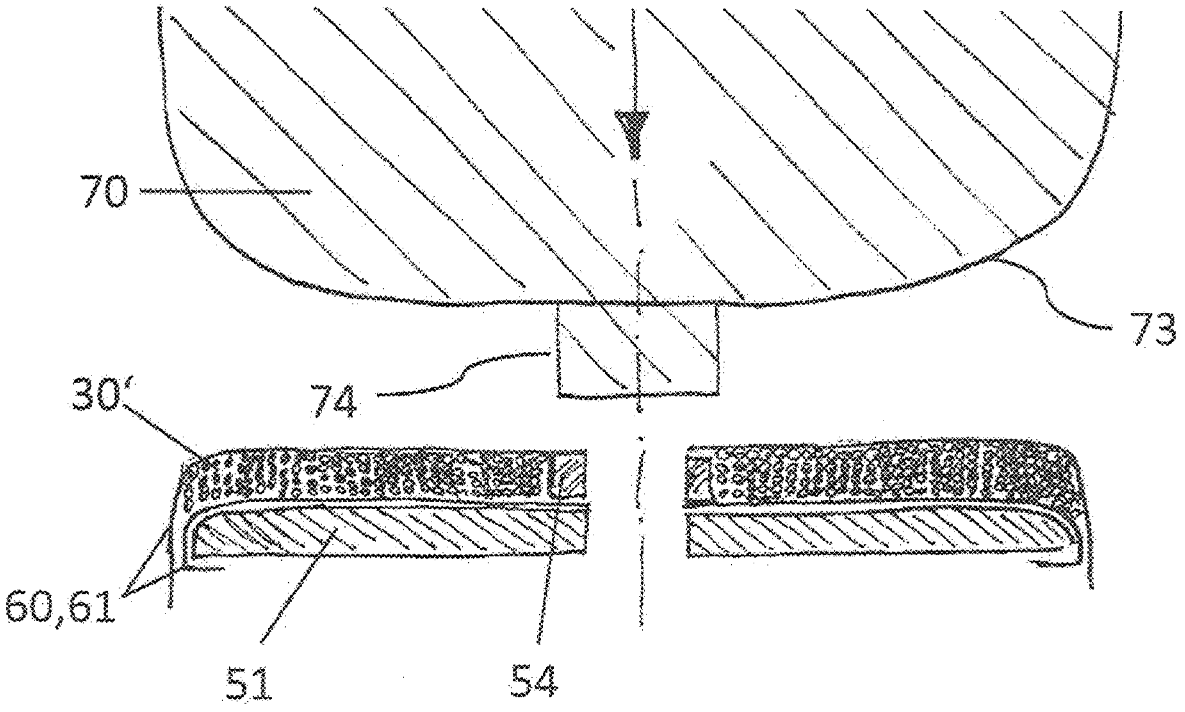
FIG. 6 shows the exemplary application of a fiber laminate on a first molding tool.

A first molding tool 70 with the convex outer contour 73 of the polar cap region of the liner is placed on so that the fiber laminate 30' can bear directly when the remaining winding plate 51 is also removed. In an alternative procedure, the arrangement of FIG. 6 is rotated through 180° so that the fiber laminate 30' lies over the molding tool 70. The fiber laminate 30' is in this case held in a suitable way until it is placed from above on the molding tool 70. The boss 74 may in this case press the winding core 54 and the winding plate 51 away upward so that the fiber laminate 30' can subsequently bear annularly around the boss 74. A boss 74 present on the first molding tool 70 is therefore guided through the central opening 72 in the fiber laminate 30', which has been formed by the winding core 54 and the winding axis 53.

Figure 7:
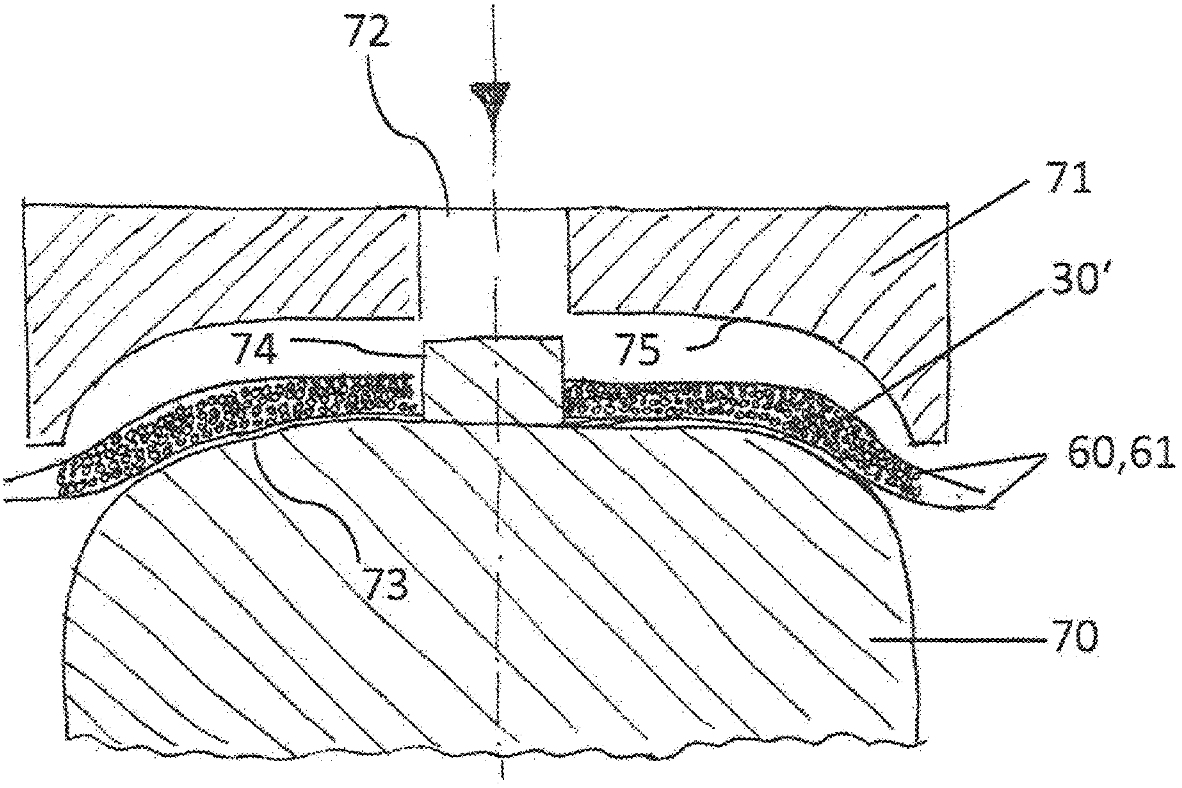
FIG. 7 shows the introduction of the fiber laminate between the first molding tool and a further second molding tool.

Alternatively, the liner itself may also be used as the first molding tool. In this case, the boss 74 is a boss connection present on the liner. Consequently, the fiber laminate 30' then annularly surrounds the boss 74, or the boss connection. The dimensions are accordingly matched to one another. The entire arrangement of FIG. 6 is subsequently rotated through 180°, or was already rotated when the fiber laminate 30' was placed on from above. This is readily possible because of the bilateral coverage of the fiber laminate 30' by the films 60, 61. FIG. 7 shows the rotated arrangement with the fiber laminate 30', which now bears from above on the first molding tool 70 and the shape of which has to some extent already been adapted to the outer contour 73 of the latter.

Figure 8:
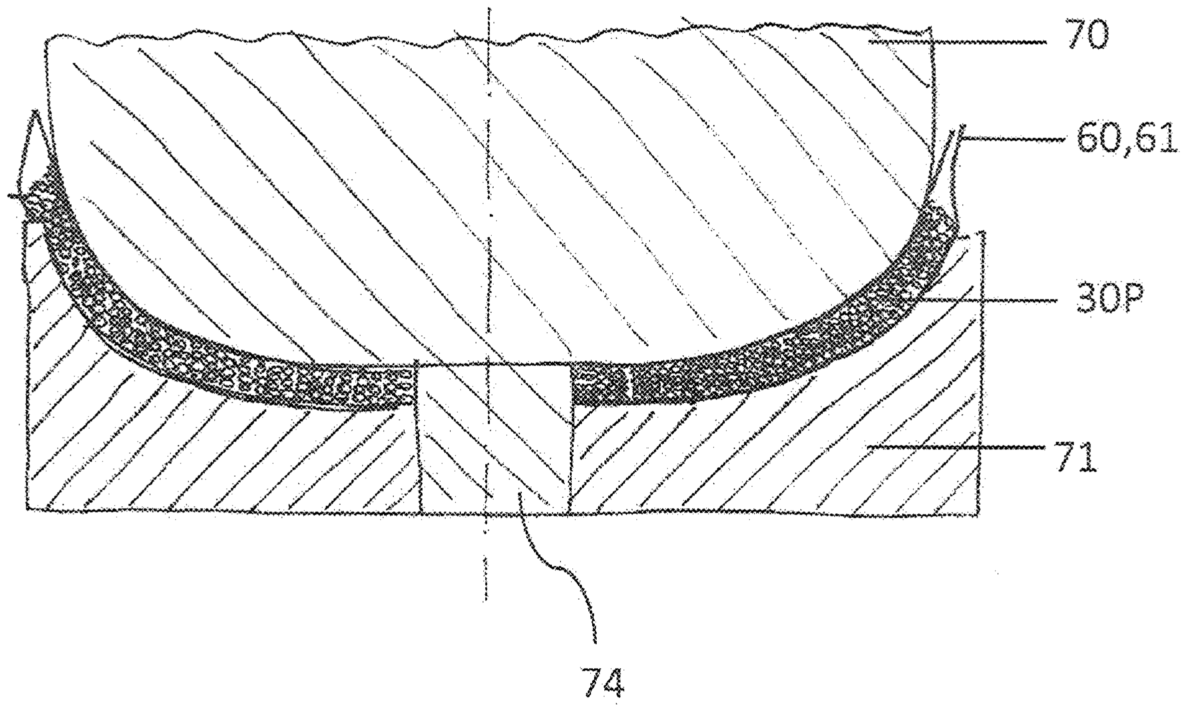
FIG. 8 shows the deformation of the fiber laminate under pressure between two molding tools.

A second molding tool 71 with the desired outer contour of the radial reinforcement is put on from above, as shown by FIG. 7. The concave inner contour 75 of the second molding tool 71 establishes the outer contour of the polar cap reinforcement to be produced. The outer contour of the radial reinforcement may be configured differently according to the vessel design and established by the second molding tool 71. The fiber laminate 30' is then shaped to final contour under pressure between the two molding tools 70, 71 (FIG. 8). This is possible because the radially wound layers of the fiber laminate 30' can slide on one another without rejects being created.

The fiber laminate 30' is gelled between the molding tools 70, 71 and the films 60, 61, then it is released. The resulting shaped and gelled fiber laminate now forms a polar cap reinforcement, which is denoted by the reference sign 30P in FIG. 8. The molding tools 70,71 do not need to be cleaned because they have not come in contact with the fiber laminate. The films 60, 61 can be peeled off without difficulty.

As shown in FIG. 3, the polar cap reinforcement 30P generated in this way may be applied onto the polar cap region 22 of a liner by guiding the boss connection 14 through the central opening in the fiber laminate. Preferably, the polar cap reinforcement 30P is adhesively bonded on the liner. The inner film 61 may remain between the liner and the polar cap reinforcement 30P or be removed beforehand. If the liner itself is used as the first molding tool, only the second molding tool 71 is removed and the polar cap reinforcement 30P remains on the liner. In this case, the film 61 remains between the liner and the polar cap reinforcement 30P.

One or both polar cap regions 22, 23 of a liner 20 are thus provided with prefabricated polar cap reinforcements. In a following winding process, the liner is initially wound with circumferential plies between the two polar cap reinforcements in the cylindrical central region 21 until there is a uniform surface with the polar caps (see FIG. 2). This cylinder reinforcement 30Z together with the two polar cap reinforcements 30P forms the radial reinforcement 30 of the pressure vessel 10. This is followed by the further winding with helical and circumferential plies according to the pressure vessel design, so that an outer reinforcement 40 is obtained. The outer film 60 is preferably removed before the outer reinforcement is applied.

Figure 4:
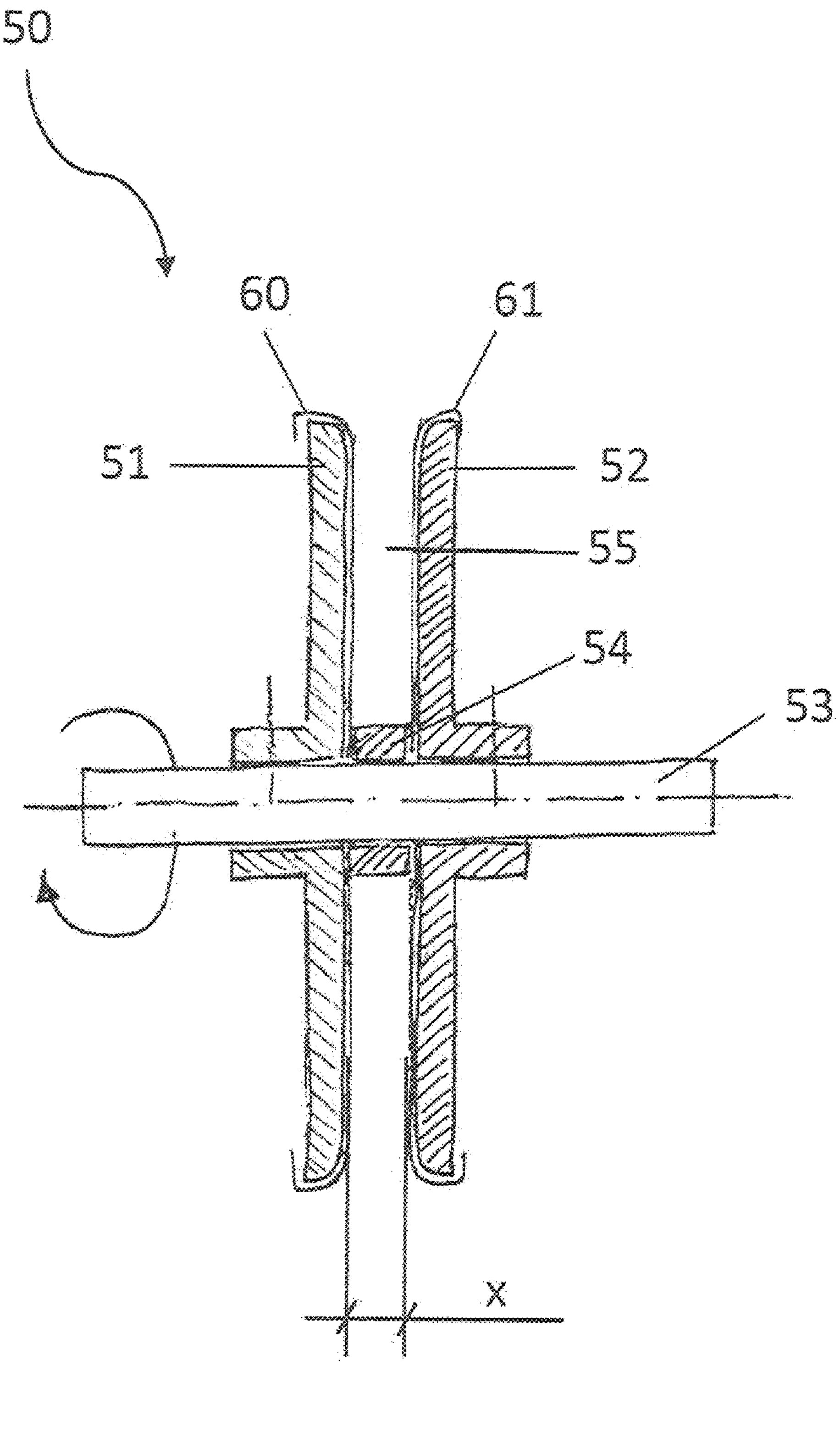
FIG. 4 shows a schematic representation of a first embodiment of a winding device for producing a polar cap reinforcement.
Figure 9:
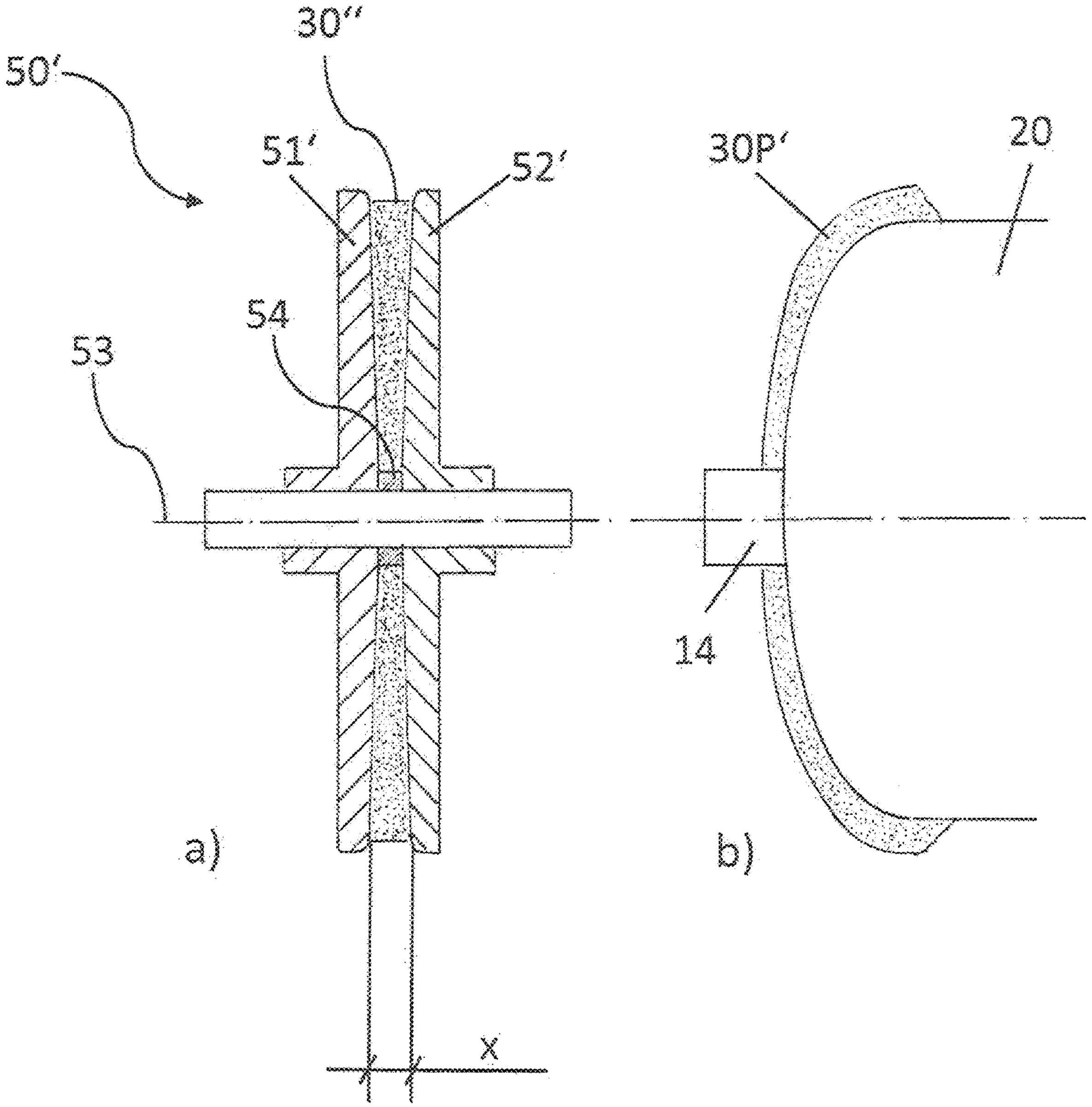
FIG. 9 shows a) a schematic representation of a second embodiment of a winding device and b) a polar cap reinforcement with a varying wall thickness on the polar cap region of an inner vessel.

The original shape of the fiber laminate 30' is simplest when the inner faces of the winding plates 51, 52 are configured perpendicularly to the winding axis 53, so that the distance x between the two winding plates 51, 52 in the radial direction is constant, as is the case with the winding device 50 according to the embodiment of FIG. 4. The wound fiber laminate 30' then has the same wall thickness x everywhere as seen in the axial direction. If this wall thickness is intended to become thicker outward (with an increasing diameter), however, this may be achieved with a winding device 50' having inner faces of the winding plates 51', 52' that correspondingly extend conically, as is shown in FIG. 9*a*). The distance x between the two winding plates 51', 52' in this case decreases toward the winding core 54. The fiber laminate 30" obtained by the winding then has a greater wall thickness outward than inward, which may be substantially preserved after the deformation between the molding tools 70, 71, as shown by the resulting polar cap reinforcement 30P' in FIG. 9*b*).

The invention claimed is:

1. A method for producing a polar cap reinforcement of a pressure vessel comprising an inner vessel and an outer layer of reinforcing fibers, which is wound around the inner vessel, wherein the inner vessel has a cylindrical central region and two domed polar cap regions which seal the openings of the cylindrical central region, characterized by the following steps:

a) providing a winding device comprising two winding plates, which are spaced apart from one another and form a gap between them, in which there is a winding core;

b) producing a resin-impregnated fiber laminate inside the gap, which is generated by repeated winding around the winding core in a circumferential direction;

c) detaching the fiber laminate from the winding device and applying the fiber laminate onto a first molding tool which has a domed outer contour of a polar cap region of the inner vessel;

d) positioning a second molding tool, which has an outer contour of a polar cap reinforcement to be produced, in order to enclose the fiber laminate between the first molding tool and the second molding tool;

e) forming the shape of the polar cap reinforcement between the first molding tool and the second molding tool by deforming the fiber laminate between the first molding tool and the second molding tool under pressure;

f) curing the fiber laminate to form the polar cap reinforcement.

2. The method as claimed in claim 1, characterized in that the first molding tool is the domed polar cap region of the inner vessel, for which the polar cap reinforcement is to be produced, and the second molding tool is removed after the curing of the fiber laminate to form the polar cap reinforcement.

3. The method as claimed in claim 1, characterized in that the cured polar cap reinforcement is released from the first molding tool and the second molding tool and applied onto the domed polar cap region of the inner vessel.

4. The method as claimed in claim 1, characterized in that the distance between inner faces of the two winding plates of the winding device is constant or decreases toward the winding core.

5. The method as claimed in claim 1, characterized in that, before the fiber laminate is produced, inner sides of the two winding plates are each coated with a detachable film which is subsequently detached from the winding device together with the fiber laminate.

6. The method as claimed in claim 5, characterized in that the fiber laminate is deformed and cured together with the detachable films between the first molding tool and the second molding tool.

7. The method as claimed in claim 1, characterized in that method step c) involves initially separating a first winding plate and the winding core in order to place the fiber laminate the second winding plate on the first molding tool, and then also removing the second winding plate, wherein the first winding plate and the second winding plates are of the two winding plates.

8. A method for producing a pressure vessel having at least one polar cap reinforcement, characterized by the following steps:

i. providing an inner vessel, which has a cylindrical central region and two domed polar cap regions, which seal the openings of the cylindrical central region;

ii. producing at least one polar cap reinforcement and applying the polar cap reinforcement on a domed polar cap region of the inner vessel, wherein producing the at least one polar cap reinforcement further comprises:

providing a winding device comprising two winding plates, which are spaced apart from one another and form a gap between them, in which there is a winding core;

producing a resin-impregnated fiber laminate inside the gap, which is generated by repeated winding around the winding core in a circumferential direction;

detaching the fiber laminate from the winding device and applying the fiber laminate onto a first molding tool which has a domed outer contour of a polar cap region of the inner vessel;

positioning a second molding tool, which has an outer contour of a polar cap reinforcement to be produced, in order to enclose the fiber laminate between the first molding tool and the second molding tool;

forming the shape of the polar cap reinforcement between the first molding tool and the second molding tool by deforming the fiber laminate between the first molding tool and the second molding tool under pressure;

curing the fiber laminate to form the polar cap reinforcement;

iii. producing a circumferential winding on the cylindrical central region of the inner vessel;

iv. winding an outer winding around the circumferential winding and the at least one polar cap reinforcement.

9. The method as claimed in claim 8, characterized in that the at least one domed polar cap region of the inner vessel has a connecting flange which surrounds the annular polar cap reinforcement after the removal of the winding core.

* * * * *